United States Patent
Mulholland et al.

(10) Patent No.: US 11,119,912 B2
(45) Date of Patent: Sep. 14, 2021

(54) ORDERING DATA UPDATES FOR IMPROVING GARBAGE COLLECTION BEING PERFORMED WHILE PERFORMING THE SET OF DATA UPDATES

(71) Applicant: International Business Machines Corporation, Armonk, NY (US)

(72) Inventors: Miles Mulholland, Hampshire (GB); Gordon D. Hutchison, Eastleigh (GB); Ben Sasson, North Baddesley (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 16/363,751

(22) Filed: Mar. 25, 2019

(65) Prior Publication Data

US 2020/0310962 A1 Oct. 1, 2020

(51) Int. Cl.
*G06F 12/02* (2006.01)
*G06F 3/06* (2006.01)

(52) U.S. Cl.
CPC .......... *G06F 12/0253* (2013.01); *G06F 3/061* (2013.01); *G06F 3/067* (2013.01); *G06F 3/0646* (2013.01)

(58) Field of Classification Search
CPC ........... G06F 12/0253; G06F 2212/702; G06F 3/0619; G06F 3/0665; G06F 3/0689;
(Continued)

(56) References Cited

U.S. PATENT DOCUMENTS 8,898,410 B1 * 11/2014 Ehrenberg .......... G06F 12/0246
711/162
9,785,575 B2 10/2017 Song et al.
(Continued)

FOREIGN PATENT DOCUMENTS

WO 2017146805 A1 8/2017

OTHER PUBLICATIONS

Guo et al., "Parallelism and Garbage Collection aware I/O Scheduler with Improved SSD Performance," IEEE International Parallel and Distributed Processing Symposium, 2017, pp. 1184-1193.
(Continued)

*Primary Examiner* — Zhuo H Li
(74) *Attorney, Agent, or Firm* — Zilka-Kotab, P.C.

(57) ABSTRACT

A computer-implemented method according to one embodiment includes receiving, by a target system from a source system, a description of a set of data updates that are to be written to the target system. For each given portion of data of the target system that is to be rewritten during performance of the set of data updates, forward lookup is performed on the target system for determining a physical storage address of the given portion of data. The method further includes marking each of the determined physical storage addresses of the portions of data of the target system in a copy of a reverse lookup table of the target system. The marked-up reverse lookup table is used for determining an ordering in which the performance of the set of data updates would result in a least amount of garbage collection being performed while performing the set of data updates.

20 Claims, 8 Drawing Sheets

(58) Field of Classification Search
CPC .......... G06F 2212/7205; G06F 3/0608; G06F 3/0634; G06F 3/064; G06F 3/0683; G06F 3/061; G06F 3/0646; G06F 3/067; G06F 12/0238; G06F 3/065; G06F 3/0685
See application file for complete search history.

(56) References Cited

U.S. PATENT DOCUMENTS

| | | | |
|---|---|---|---|
| 2013/0232296 A1* | 9/2013 | Yonezawa | G06F 12/0246 711/103 |
| 2015/0227602 A1* | 8/2015 | Ramu | G06F 16/2365 707/634 |
| 2017/0102884 A1* | 4/2017 | Kim | G06F 3/0613 |
| 2018/0004448 A1 | 1/2018 | Romem et al. | |
| 2018/0157586 A1* | 6/2018 | Yi | G06F 12/0246 |
| 2018/0373444 A1* | 12/2018 | Mulholland | G06F 3/0689 |

OTHER PUBLICATIONS

U.S. Appl. No. 15/868,454, filed Jan. 11, 2018.

* cited by examiner

ORDERING DATA UPDATES FOR IMPROVING GARBAGE COLLECTION BEING PERFORMED WHILE PERFORMING THE SET OF DATA UPDATES

BACKGROUND

The present invention relates to data storage, and more specifically, this invention relates to use of cost determinations for determining an order of performing a set of data updates that results in a least amount of garbage collection being performed while performing the set of data updates.

Garbage collection is a process often used in memory management, in which data storage locations currently storing data objects that can no longer be accessed, e.g., have been deleted by a user, are reclaimed. Garbage collection is sometimes performed concurrently with user write operations. For example, as data is written to a device, the device controller may continuously perform garbage collection on logical erase blocks (LEBs) with invalid data to make space for the new incoming data.

Thin-provisioned volumes are volumes presented by storage systems where the presented storage can be larger than the underlying physical storage.

SUMMARY

A computer-implemented method according to one embodiment includes receiving, by a target system from a source system, a description of a set of data updates that are to be written to a target volume of the target system. The description includes a file that identifies grains of address ranges of the source system that are to be copied to the target system. For each given portion of data of the target system that is to be rewritten during performance of the set of data updates, forward lookup is performed on the target system for determining a physical storage address at which the given portion of data is located in the target system. The method further includes marking each of the determined physical storage addresses of the portions of data of the target system in a copy of a reverse lookup table of the target system. The marked-up reverse lookup table of the target system is used for determining an ordering in which the performance of the set of data updates would result in a least amount of garbage collection being performed while performing the set of data updates. The method further includes sending the determined ordering to the source system, and receiving the set of data updates in accordance with the determined ordering.

A computer program product for determining an ordering in which performance of a set of data updates would result in a least amount of garbage collection being performed while performing the set of data updates according to one embodiment includes a computer readable storage medium having program instructions embodied therewith. The program instructions are readable and/or executable by a target system to cause the target system to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
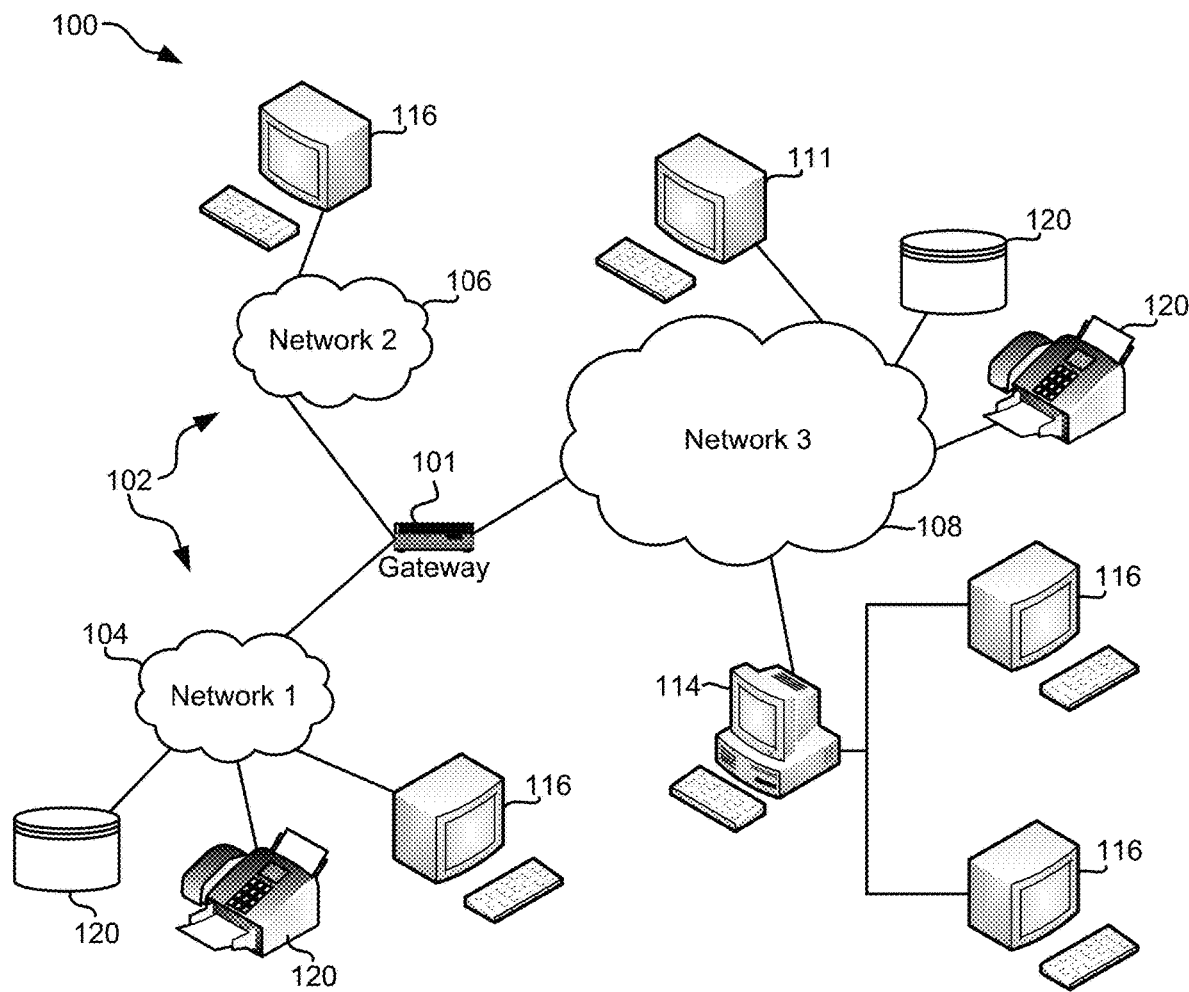
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining an ordering in which performance of a set of data updates would result in a least amount of garbage collection being performed while performing the set of data updates.

In one general embodiment, a computer-implemented method includes receiving, by a target system from a source system, a description of a set of data updates that are to be written to a target volume of the target system. The description includes a file that identifies grains of address ranges of the source system that are to be copied to the target system. For each given portion of data of the target system that is to be rewritten during performance of the set of data updates, forward lookup is performed on the target system for determining a physical storage address at which the given portion of data is located in the target system. The method further includes marking each of the determined physical storage addresses of the portions of data of the target system in a copy of a reverse lookup table of the target system. The marked-up reverse lookup table of the target system is used for determining an ordering in which the performance of the set of data updates would result in a least amount of garbage collection being performed while performing the set of data updates. The method further includes sending the determined ordering to the source system, and receiving the set of data updates in accordance with the determined ordering.

In another general embodiment, a computer program product for determining an ordering in which performance of a set of data updates would result in a least amount of garbage collection being performed while performing the set of data updates includes a computer readable storage medium having program instructions embodied therewith. The program instructions are readable and/or executable by a target system to cause the target system to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
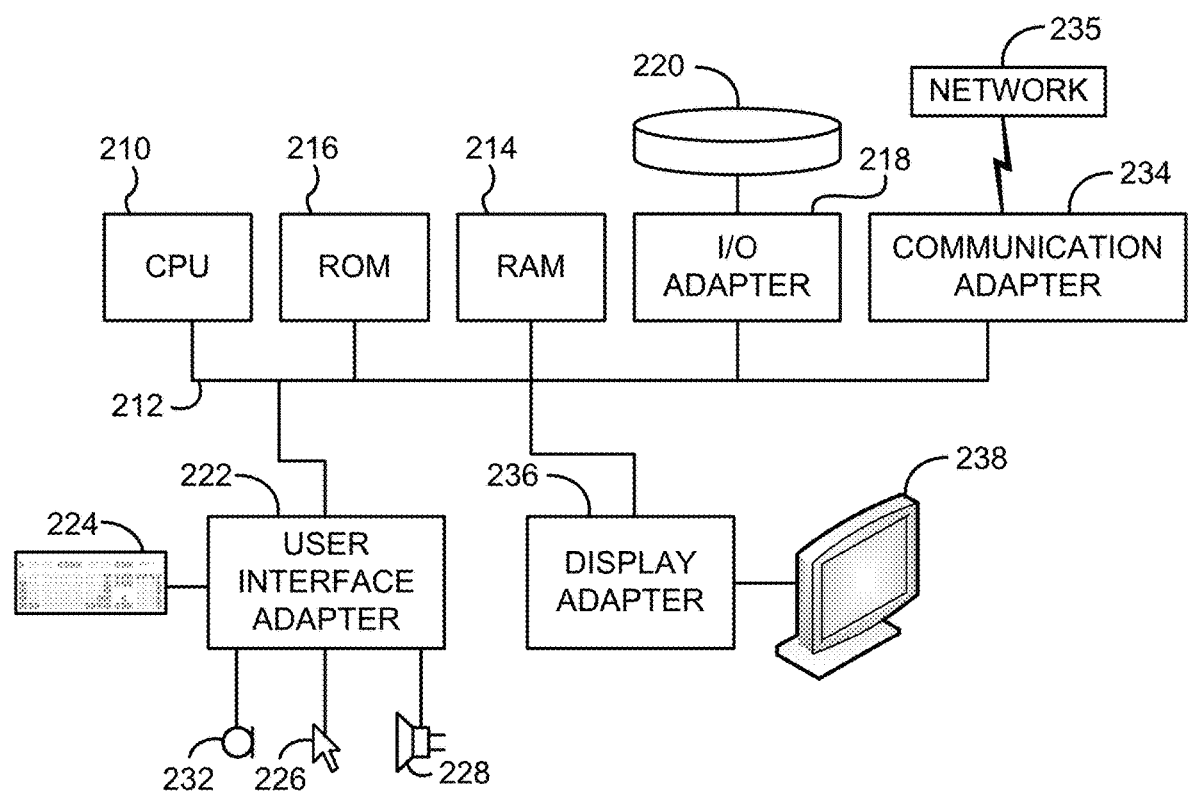
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

As described elsewhere above, garbage collection is a process often used in memory management, in which data storage locations currently storing data objects that can no longer be accessed are reclaimed. For example, data objects that can no longer be accessed include objects that have been deleted by a user. Garbage collection is sometimes performed concurrently with user write operations. For example, as data is written to a device, the device controller may continuously perform garbage collection on LEBs with invalid data to make space for the new incoming data.

Thin-provisioned volumes are volumes presented by storage systems where the presented storage can be larger than the underlying physical storage. In order to achieve such a volume presentation, a metadata structure is sometimes used to map between allocated regions and the physical domain. In some approaches, in response to a read for an unallocated virtual region being performed, a buffer of zeros may be returned.

In some thin-provisioned systems, allocation may be relatively trivial. For example, allocation may continue from physical address 0 in a linear fashion, with rewrites being performed over the previously allocated writes. However, as will now be described, attempting to perform compression in tandem with thin-provisioning may be relatively more complicated. If data has already been written to a particular logical block address (LBA), and the particular LBA is later rewritten with different data, it cannot be guaranteed that the rewritten data has the same compression ratio. Moreover, it cannot be assumed that the subsequent version of the data fits into the same storage space as the previous version.

Accordingly, a new data area is allocated, and the previous data area of the LBA becomes unused.

Under such a mechanism, garbage collection is performed in areas of storage that have not recently experienced garbage collection, e.g., sometimes referred to as "old areas." Some conventional techniques include allocating data areas from garbage collection units, e.g., units large enough to handle multiple writes, and upon a rewrite occurring, part of the garbage collection unit may be marked as being free, e.g., reusable space within storage. Upon all members of a garbage collection unit becoming free, the available space may be reused in a trivial fashion.

Under several workloads, e.g., such as random I/O, it cannot be guaranteed that an I/O pattern will free garbage collection units by itself, and thus synthetic I/O is performed by some conventional thin-provisioned storage systems in order to move blocks of data from a garbage collection unit that is being targeted for recycling to a new destination garbage collection unit. Upon completion of the movement of the data, an update may be performed to the metadata that locates it, e.g., mapping metadata structure, reverse lookup metadata structure, etc., and thus the system may be in a consistent state.

Only once the above described conventional process has been performed for all data areas in a garbage collection unit can the storage in the target garbage collection unit be reclaimed.

Various embodiments and approaches described herein include ensuring efficiency in storage environments by controlling the order in which a set of data updates are received, and consequently performed. Specifically, such efficiency is ensured by determining an ordering in which the performance of the set of data updates would result in a least amount of garbage collection being performed while performing the set of data updates.

Figure 3:
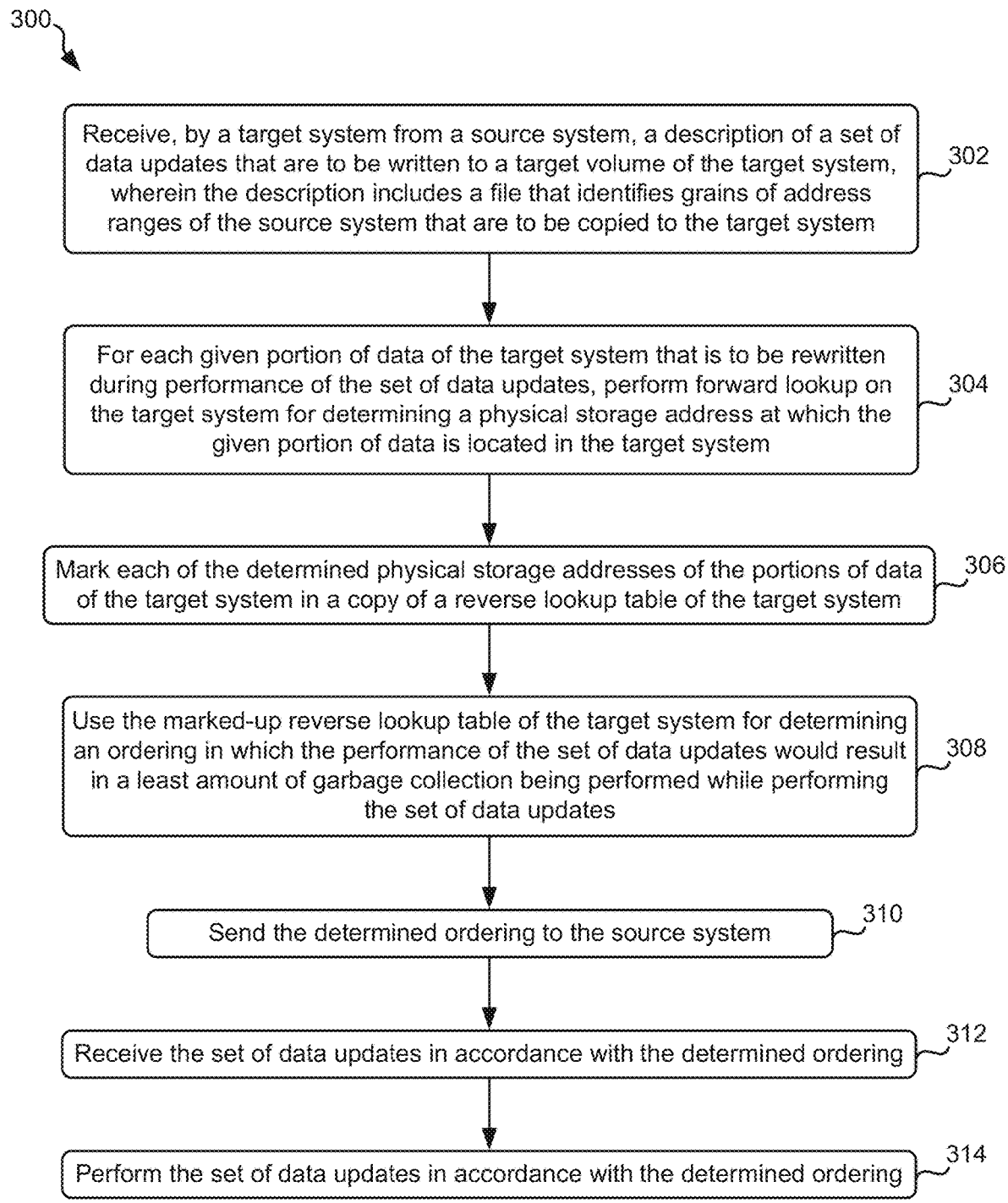
FIG. 3 is a flowchart of a method in accordance with one embodiment.

Now referring to FIG. 3, a flowchart of a method 300 is shown according to one embodiment. The method 300 may be performed in accordance with the present invention in any of the environments depicted in FIGS. 1-2 and 4A-4G, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a target system, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that although method 300 is described from the perspective of a target system, in other embodiments and/or approaches, one or more operations may be described from the perspective of a source system. For example, in another embodiment, the source system may additionally and/or alternatively perform the operations of the target system in method 300, and the target system may additionally and/or alternatively perform the operations of the source system in method 300, e.g., to update the data of the source system to reflect a data update of the target system.

The target system and/or the source system may be any type of system(s). Multiple volumes may exist on the source system and/or the target system, each of which may be mapped against a single physical domain. According to some more specific approaches, the source system and/or the target system may be coalesced-write thin-provisioned system(s). Moreover, the target system and/or source system may utilize thin-provisioned garbage collected volumes. Allocation on the source system side and/or on the target system side may be at least in part handled by separate garbage collection schedulers.

Operation 302 of method 300 includes receiving, by a target system from a source system, a description of a set of data updates and/or a subset of data updates, that are to be written to a target volume of the target system, e.g., such as a compressed volume. In one approach, in response to any change being made to data of a volume of the source system, the source system may generate and add a description of the data update to the description of a set of data updates, e.g., the reversal of a flash copy relationship.

The description of the set of data updates may be sent by the source system to the target system at any time, e.g., in response to the description reflecting a predetermined number of updates, in response to a predetermined amount of time elapsing since the target system has received a description, in response to the target system requesting to be sent a description of a set of data updates, etc.

The set of data updates may include any one or more type of known updates. For example, in some approaches, the data updates may include an I/O batch workload. In another approach, the data updates may additionally and/or alternatively include an application of the reversal of a FlashCopy mapping to a compressed volume on the target system. In such an approach, performing such an update may include a set of writes being performed to an existing compressed volume to update the volume to have the same contents as the FlashCopy target that is being reversed. According to yet another approach, the data update of the description may additionally and/or alternatively include a subset of a source volume of the source system that is to be copied to an existing version of a target volume of the target system.

Moreover, the description may include a file, e.g. a bitmap, that identifies grains of address ranges of the source system that are to be copied to the target system, e.g., copied by a write function. To clarify, the term "grains" of grains of address ranges may be different characteristics that determine the specific ranges being updated by the source system in relation to the virtual address space. Typically a grain refers to the smallest quantum of virtual address space a forward lookup structure is able to represent, without having to perform read-modify-writes when updating said range for a grain-aligned I/O (i.e. the virtual address space represented by a single leaf entry in a given tree may represent a 'grain'). According to several more specific approaches, the grains of address ranges of the source system may specify locations of data on the source system that have been updated but not yet reflected on the target system.

In some approaches, the target system and/or the source system and/or the data updates of the received description may be subject to having qualifying criteria in order for operations of method 300 to be applied to the set of data updates of the received description. In other words, certain types of systems and/or data updates may be particularly susceptible to receiving the beneficial results of performing method 300 in conjunction with a set of data updates. Therefore, in some approaches performance of one or more operations of method 300 may depend on the target system and/or the source system and/or the data updates adhering to at least one criterion of a predefined set of criteria.

In one approach, such a criterion may be the target volume of the target system having a logical to physical address gathered write type mapping. According to another approach, a criterion may additionally and/or alternatively be that new data contents need not be necessarily written to the same physical address on the target system and/or on the source system. Instead, due to varying compression ratios for compressed volumes or varying de-duplication based on data contents, the data contents may be capable of being distributed, e.g., split apart for a plurality of writes, to more than one physical storage location of the target volume. Another criterion may additionally and/or alternatively be that there exists a set of known data updates that are to be applied to the target system. In yet another approach, a criterion may additionally and/or alternatively be that an order that the set of writes associated with the data updates are applied is not critical.

In some preferred approaches, the target system may accept the description based on the data updates of the description having one or more of the criteria.

With continued reference to method 300, various operations below may be used for determining an ordering of performing the set of data updates that results in a least amount of garbage collection being performed while performing the set of data updates.

For each given portion of data of the target system that is to be rewritten during performance of the set of data updates, forward lookup may be performed on the target system for determining a physical storage address at which the given portion of data is located in the target system, e.g., see operation 304 of method 300. The forward lookup may be performed on any one or more portions of the target system. For example, in one approach, known techniques of forward lookup may be performed on a data-reduction disk of the target system.

Each of the determined physical storage addresses of the portions of data of the target system may be marked in a copy of a reverse lookup table of the target system, e.g., see operation 306 of method 300. According to one approach, marking the determined physical addresses may include mapping areas of virtual address LBAs of the target system that are anticipated to change as a result of performing the data updates to the determined physical addresses.

The marked-up reverse lookup table of the target system may be used for determining an ordering in which the performance of the set of data updates would result in a least amount of garbage collection being performed while performing the set of data updates, e.g., see operation 308 of method 300.

According to some approaches, because the marked physical storage addresses may not be independently rewriteable without data losses, predefined regions of the target system target volume that include at least one of the marked physical storage addresses may be considered for determining the ordering in which the data updates are performed. For example, in some approaches, each determined physical storage address may be associated with one or more garbage collection units of a garbage collection region. Each of the garbage collection regions and/or each of the one or more marked physical storage addresses of the garbage collection regions may be considered as potential rewrite-options. These options may be stored in metadata, and in one approach, space for an associated target timestamp may additionally be reserved in the metadata.

Determining the ordering in which the data updates are performed may in some approaches include one or more sub-operations. For example, in one approach, determining the ordering may include determining a cost of performing garbage collection for each of the garbage collection regions. As will be described below, each of such determined costs may consider any one or more variables, e.g., an amount of processing resources (a number of megabytes) that are anticipated to be expended in performing garbage collection on garbage collection unit(s) of a given garbage collection region, an amount of processing resources that are anticipated to be expended in performing data update(s) on one or more garbage collection unit(s) of a given garbage collection region, the marked physical storage addresses of the garbage collection regions, etc.

In one approach, the cost of performing garbage collection may be determined by considering an amount of processing resources that are anticipated to be expended in performing garbage collection on garbage collection unit(s) of a given garbage collection region. For example, in one approach, a cost of a first garbage collection region may be determined to be higher than a determined cost of a second garbage collection region in response to garbage collection in the first garbage collection region including less movements of data than a number of data movements included in performing garbage collection on the second garbage collection region.

In some other approaches, a cost determination of a garbage collection region may not include a relative comparison between different garbage collection regions. Instead, in some approaches, the cost of a given garbage collection region may be determined by comparing the states of garbage collection units of a garbage collection region against a predetermined threshold. As will be described in greater detail elsewhere herein, a state of a garbage collection unit may include, e.g., containing live data, containing data that is to be updated based on the set of data updates of the received description, containing free reusable space within the physical storage, containing free space that that may be reclaimed (invalidated regions of physical storage), etc. In some approaches, a predetermined cost may be assigned to garbage collection region(s) that include a predetermined percentage of free garbage collection units, e.g., >x % of the garbage collection units are currently available for reuse (where "x %" is the predetermined percentage).

In yet another approach, the cost of performing garbage collection may additionally and/or alternatively be determined by discounting the cost of garbage collection regions that include one or more garbage collection units that are in an empty state, e.g., invalidated garbage collection units that have been overwritten/are no longer pointed at by any forward lookup structure and therefore may be reclaimed.

The cost of performing garbage collection for each of the garbage collection regions may in some approaches be determined using a function. Such a function may include any one or more variables. For example, a variable of the function for determining the cost of performing garbage collection for a given garbage collection region may include an amount of target system processing resources that are anticipated to be utilized in recovering a given garbage collection unit of the garbage collection region. In another approach, a variable of the function for determining the cost of performing garbage collection for a given garbage collection region may additionally and/or alternatively include a number of metadata updates that are anticipated to be performed in recovering the given garbage collection unit, e.g., transition a state of the garbage collection unit to free (reusable space). In yet another approach, a variable of the function for determining the cost of performing garbage collection for a given garbage collection region may additionally and/or alternatively include time.

In some approaches, the function for determining the cost of performing garbage collection for a given garbage collection region may be a sum of a plurality of determined costs of performing garbage collection for garbage collection units of the garbage collection region, e.g., see Equation 2. Equation 1 may be used to determine the cost of performing garbage collection on a given garbage collection unit (GCU) of the garbage collection region.

$$f(GCU,t) = N_R + N_U \quad \text{(Equation 1)}$$

$$f(GCR) = f(GCU_1,t) + f(GCU_2,t) + \ldots + f(GCU_n,t) \quad \text{(Equation 2)}$$

In Equation 1, the function f(GCU, t) represents a function for determining the cost of performing garbage collection for a garbage collection region "GCU", the variable $N_R$ represents a number of megabytes that are anticipated to be transposed in recovering the garbage collection unit GCU, and the variable $N_U$ represents a number of metadata updates that are anticipated to be performed in recovering the garbage collection unit GCU. Moreover, in Equation 2, the function f(GCR) represents a function for determining the cost of performing garbage collection for a garbage collection region "GCR", where GCR includes $GCU_1$-$GCU_n$.

It should be noted that the function f(GCU, t) and thereby the function f(GCR) are time dependent, e.g., "t." This is because if a garbage collection unit is subject to garbage collection immediately, performing overwrite data updates after the garbage collection unit's contents that are in a live state have been relocated will only results in additional I/O. In other words, in some preferred approaches, garbage collection is ideally performed on a garbage collection unit so long as data of a data update has not already been written to the garbage collection unit.

According to some approaches, the cost of performing garbage collection may additionally and/or alternatively be determined by determining costs associated with potential orderings in which writes associated with the data updates may be performed on garbage collection units. Each determined cost of performing the writes may be compared with determined costs of performing garbage collection that consider an amount of processing resources that are anticipated to be expended in performing garbage collection, e.g., see Equation 1 and/or Equation 2. Based on the comparison, any of the determined costs of performing garbage collection for a given garbage collection region may in some approaches be changed. For example, a determined cost of performing garbage collection for a given garbage collection region may increase in response to the given garbage collection region including a garbage collection unit with a relatively time-consuming scheduled write operation (relative to other scheduled writes of other garbage collection units).

The number of orderings in which the data updates may be performed on garbage collection units may be a factorial of the number of data updates that exist. For example, there may be six possible orders in which three data write operations are performed by the target system, e.g., 3!. However known heuristics techniques may be applied to the determining of the cost of performing garbage collection in order to reduce the potential number of orderings of the updates considered. For example, at least some of the potential orderings may be forgotten in response to such orderings beginning with an update which is determined to have relatively high costs of performing garbage collection.

The potential orderings in which the data updates may be performed may in some approaches be further reduced by additionally and/or alternatively considered that some write operations may be grouped into a single write operation, e.g., up to an including a write the size of a garbage collection unit. For example, in one approach the determined cost of performing garbage collection on a given garbage collection region may decrease in response to write operations being grouped into a single batch write operation rather than the write operations otherwise being individually performed. This may be particularly true in systems that utilize sequential workloads, e.g., virtual writes of the data updates map sequentially to physical domain writes.

In some approaches, it may be assumed that once commenced, writes may be applied roughly in the determined optimal order, at a given rate, e.g., such as a predetermined rate, a rate in which a processor of the target system and/or network is capable of supporting, an average data transfer rate, etc. Based on this, it may be determined when an $x^{th}$ ordered data update will be initiated if the determined ordering is honored. For purposes of a non-limiting example, reference will now be made to a function f(GCU, t, batch_t) of Equation 3. Using the function, according to one approach, movement(s) of data may only be considered beneficial if a batch of data update operations are performed in a given garbage collection unit before garbage collection is performed. Moreover, in such an approach, the movement(s) may only be considered beneficial if it is expected that garbage collect of a garbage collection region that contains the garbage collection unit is performed before the scheduled data update batch expires/completes. Because a sufficient amount of storage space is preferably garbage collected on the target system in order to support the data updates, in some approaches, any potential ordering of performing the data updates that does not reclaim such a sufficient amount of storage space may be discarded. For example, such an ordering may include one in which too few garbage collection unit's garbage collection I/O is performed early enough. To clarify, the term "early enough" may refer to before the timeframe for which garbage collection is scheduling over.

For purposes of an example, the function f(GCU, t, batch_t) is expressed below according to one approach.

$$f(GCU,t,w) = \text{cost\_of\_}gc(GCU,t) \text{—if } (T<t \,\&\&\, t>\text{batch\_}t)\{\text{cost\_of\_}gc(\text{batch\_sectors}, 0)\} \quad \text{(Equation 3)}$$

In Equation 3 the variable T is a timeframe for which garbage collection is scheduled over, the variable t is a time for when garbage collection I/O is performed, the variable batch_t is a time for when batch I/O is performed, the variable GCU is a given garbage collection unit, the variable cost of gc is a determined cost of performing garbage collection on the given garbage collection unit GCU.

According to some approaches, a unique score may be assigned to each of the garbage collection regions and/or garbage collection units based on any of the one or more determined costs described above. In some approaches, the unique score of a garbage collection region may be a sum of a plurality of sub-scores of garbage collection units of the garbage collection region.

A predetermined one of the scores, e.g., a minimum score, a maximum score, a second from minimum score, etc., may be selected, and the potential ordering corresponding to the selected score may be set as the ordering in which the set of data updates is performed.

With continued reference to operation 308 of method 300, according to some approaches, the ordering in which the performance of the set of data updates would result in a least amount of garbage collection being performed while performing the set of data updates may be a numerical ordering of the unique scores. For example, in one approach, the numerical ordering may include a lowest score to a highest score. In another approach, the numerical ordering may alternatively include and a highest score to a lowest score.

Operation 310 of method 300 includes sending the determined ordering to the source system. In some approaches, run length encoding may be performed by the target system in order to reduce the amount of I/O utilized to transmit the determined ordering to the source system.

The set of data updates may be received by the target system in accordance with the determined ordering, e.g., see operation 312 of method 300. The received set of data updates may include any type and/or portion of data. For example, in one approach the received set of data updates may include portions of data that exist on the source system, e.g., recently updated data of the source system, but do not yet exist on the target system. In other approaches, the received set of data updates may include all portions of data of a garbage collection unit of the source system that has been updated, where the update is not yet reflected on the target system. In yet another approach, the received set of data updates may include all data of a given storage location of the source system. In such an approach, the target system may receive such data and determine what portions of the received data are to be added to the target system, e.g., by comparing the received data with data that is stored on the target system.

In some approaches, it may be assumed that data updates not explicitly included in the determined ordering may be performed after the set of data updates has been performed by the target system.

Operation 314 of method 300 includes performing the set of data updates in accordance with the determined ordering. In one approach, the set of data updates may begin being performed in accordance with the determined ordering subsequent receiving at least some of the set of data updates. In some other approaches, the set of data updates may begin being performed in accordance with the determined ordering only once each of the data updates of the set of data updates are received by the target system.

As briefly mentioned elsewhere herein, performing the set of data updates may in some approaches include rewriting one or more of the portions of data of the target system. According to a more specific approach, performing the set of data updates may include rewriting more than one of the portions of data of the target system in a batch write, e.g. provided that a size of the batch write is not greater than a size of the garbage collection unit being rewritten.

In some approaches, any performance of the rewriting at least one of the portions of data may be postponed until any garbage collection performed on the at least one of the portions of data is completed. Such postponement may be applied in order to prevent new data writes from being deleted during garbage collection.

During performance of the data updates, in response to unexpected space constraints/requirements emerging, method 300 may optionally include ramping up garbage collection I/O rates on the target system (at the cost of user I/O rates).

There are several benefits to using method 300 and/or other approaches/embodiments described herein. Such benefits particularly relate to the efficiency of data storage systems, e.g., relative to processing. In order to realize such benefits, it may be considered that data writes are often performed in conventional systems as a set of writes to an existing dataset, as opposed to a series of writes. However, because existing datasets in such conventional systems are often stored in a compressed form (having different compression ratios), logical to physical LBA mapping often utilizes processing intensive forms of garbage collection as the data is rewritten with the new values (described elsewhere above). It may be recalled that some conventional techniques include allocating data areas from garbage collection units, e.g., units large enough to handle multiple writes, and upon a rewrite occurring, part of the garbage collection unit may be marked as being free. Upon all members of a garbage collection unit becoming free, the available space may be reused in a trivial fashion. However, under several workloads, e.g., such as random I/O, the conventional garbage collection cannot guarantee that an I/O pattern will free garbage collection units by itself, and thus, conventionally, synthetic I/O is performed.

In sharp contrast to these deficiencies of conventional techniques, as a result of determining an ordering in which the performance of a set of data updates results in a least amount of garbage collection being performed while performing the set of data updates, less processing resources are utilized than would otherwise be utilized if such updates were performed in an unspecified order. In addition to this, less fragmentation occurs on the physical domain of the target system and/or the source system. Moreover, an amount of I/O utilized to reclaim space is reduced. Specifically, the I/O operations used to reclaim space are the data updates and not synthetic I/O as used in conventional systems. Long-term churn of data on the physical domain is also reduced or eliminated as a result.

These benefits are not just subject to data updates. For example, any batch task and any sort of relationship between these tasks can be reordered using the techniques of various embodiments and/or approaches described herein in order to increase efficiency of batch operations being performed in a system and/or between more than one system.

FIGS. 4A-4G depict a multi-system architecture 400 for determining an ordering in which performance of a set of data updates would result in a least amount of garbage collection being performed while performing the set of data updates, in accordance with one embodiment. As an option, the present multi-system architecture 400 may be implemented in conjunction with features from any other embodiment listed herein, such as those described with reference to the other FIGS. Of course, however, such multi-system architecture 400 and others presented herein may be used in various applications and/or in permutations which may or may not be specifically described in the illustrative embodiments listed herein. Further, the multi-system architecture 400 presented herein may be used in any desired environment.

Figure 4A:
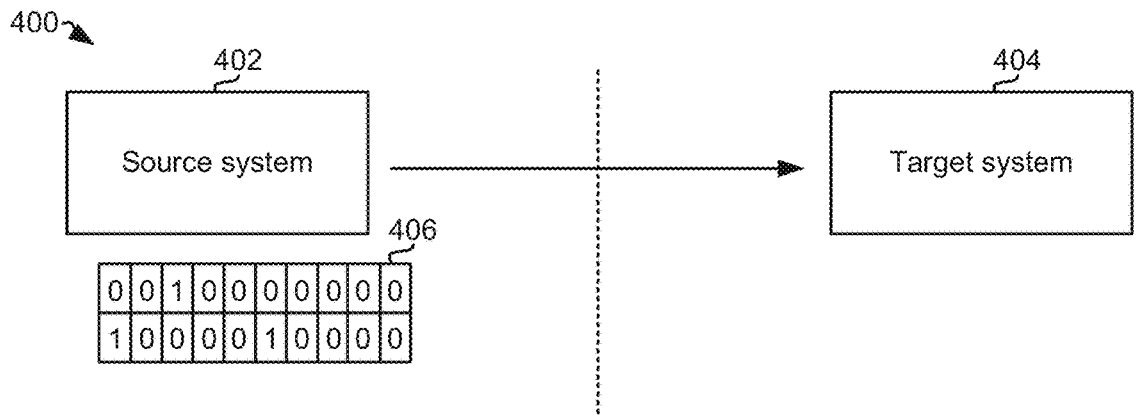
FIGS. 4A-4G depict a multi-system architecture in accordance with one embodiment.
Figure 4B:
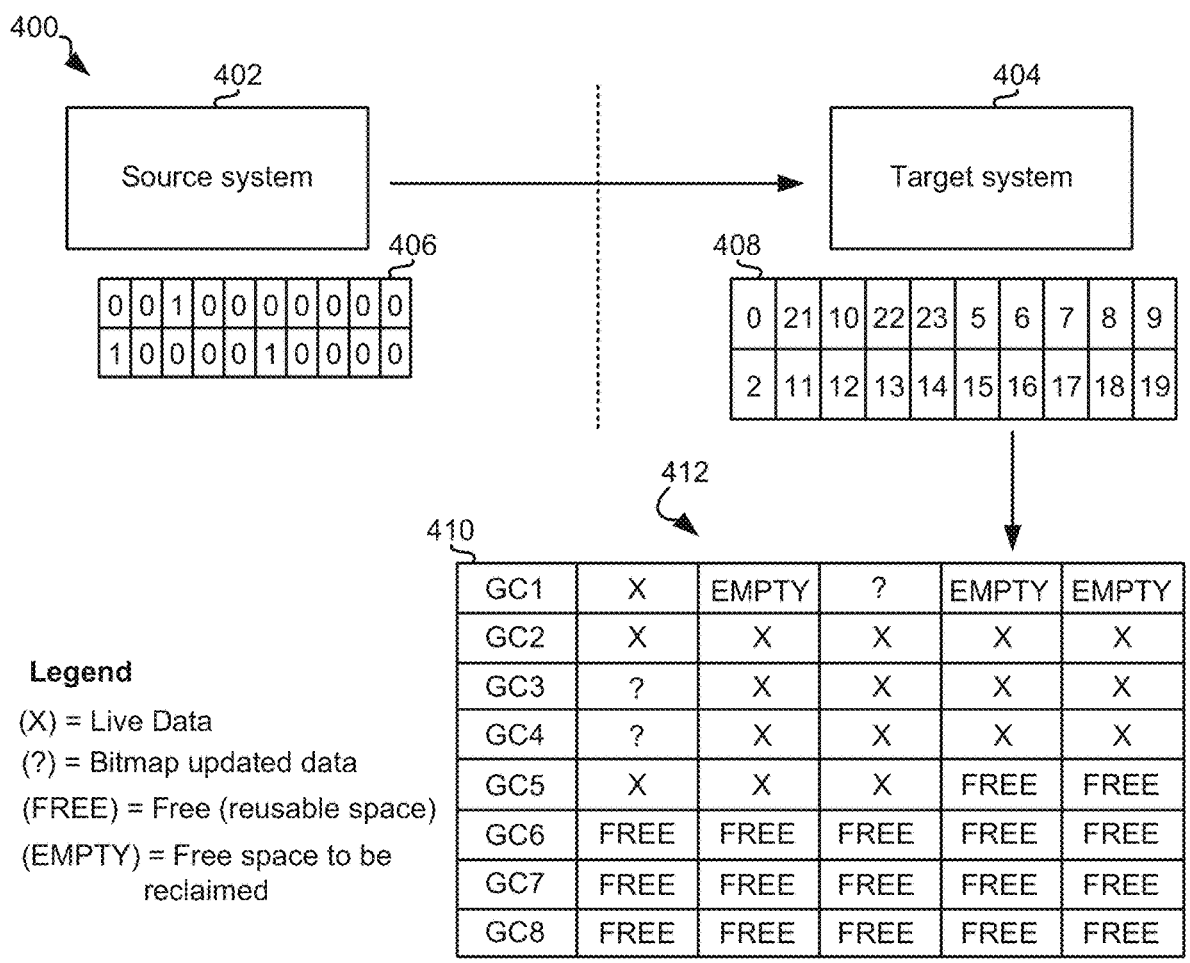
Figure 4C:
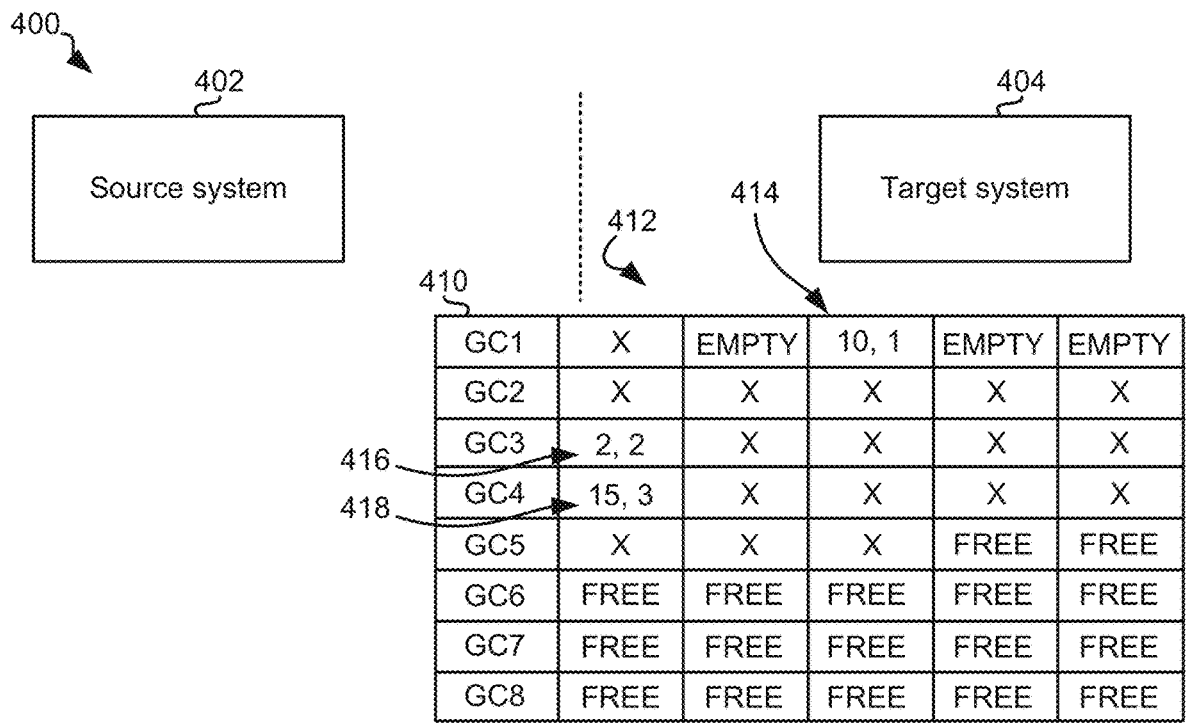

Referring first to FIG. 4A, the multi-system architecture 400 includes a source system 402 and a target system 404. A description 406 of a set of data updates that are to be written to a target volume of the target system 404 is received by the target system 404 from the source system 402. The description may include a file, e.g., a bitmap, that identifies grains of address ranges of the source system 402 that are to be copied to the target system 404.

For each given portion of data of the target system 404 that is to be rewritten during performance of the set of data updates, forward lookup may be performed on the target system 404 for determining a physical storage address at which the given portion of data is located in the target system 404. For example, FIG. 4B includes a representation of virtual to physical mapping 408. In other words, forward lookup may be performed on the target system 404 in order to identify where on physical storage of the target system, e.g., disk, the ranges specified in the description actually reside. Note that because the virtual physical mapping is non-linear in the present approach, the location of the range within physical storage may depend on the underlying state of the system. Accordingly, several forward lookup operations may be performed to identify the physical location of the ranges are to be overwritten in performing the data updates.

The determined physical storage addresses of the portions of data of the target system are marked in a copy of a reverse lookup table 410 of the target system. Moreover, within the copy of a reverse lookup table 410 of the target system, the portions of data may be mapped to a particular garbage collection unit of a garbage collection region, e.g., see garbage collection regions CG1-CG8 which each contain five respective garbage collection units 412.

In the present approach, for the reverse lookup table 410, a marking "X" may represent live data, and a marking "?" may represent data that is to be updated based on the set of data updates of the received description. Moreover, a marking of "FREE" represents free reusable space within the physical storage, and the marking "EMPTY" represents free space that that may be reclaimed, e.g., invalidated regions of physical storage.

In some approaches, the garbage collection regions may be viewed by a garbage collection scheduler of the target system to be contiguous physical storage space, however, this may be different than the underlying storage layer, depending on the implementation. For purposes of an example, in terms of the garbage collection regions CG1-GC8 corresponding to physical storage, e.g., on a disk, it may be assumed that the multi-system architecture 400 includes a quasi-terabyte back end array. A created volume on top of that may in furtherance of the present example be assumed to be 100 terabytes, which may correspond to a 1:1 mapping on the array. Accordingly, the marked reverse lookup table may serve as a virtualization layer between a conceptual volume and the actual storage, e.g., on disk storage. Moreover, in such a virtualization, each garbage collection region may correspond to a range of the physical storage. For example, according to another example, GC1 may dock LBA 0 gigabyte of the target system to an LBA 1 gigabyte of the target system, GC2 may dock LBA 1 gigabyte of the target system to LBA 2 gigabyte of the target system, etc.

The marked-up reverse lookup table 410 of the target system 404 may be used for determining an ordering in which the performance of the set of data updates would result in a least amount of garbage collection being performed while performing the set of data updates. For example, referring now to FIG. 4C, it may be determined (using the marked reverse lookup table) that the ordering in which the performance of the set of data updates would result in a least amount of garbage collection being performed while performing the set of data updates includes rewriting the portion of data in garbage collection unit 414 of garbage collection region GC1 first, e.g., see "1" of "10, 1." Such a determination may be made at least in part based on the fact that a majority of garbage collection units within GC1 are marked as being readily reclaimable, e.g., see "EMPTY." Moreover, it may be determined that such an ordering includes rewriting the data of garbage collection units 416, 418 of garbage collection units GC3, GC4 (respectively) thereafter. Such a determination may be based on the marked reverse lookup table indicating that the rewriting of the data of garbage collection unit 416 includes moving four instances of live data, and similarly the rewriting of the data of garbage collection unit 418 includes moving four instances of live data, e.g., see Xs of CG3 and CG4. Accordingly, the determined ordering includes rewriting the portion of data in garbage collection unit 416 of garbage collection region GC3 second, e.g., see "2" of "2, 2," and rewriting the portion of data in garbage collection unit 418 of garbage collection region GC4 third, e.g., see "3" of "15, 3."

In some other approaches, at least some of the data updates may be incorporated into the determined ordering using process of elimination, e.g., in order to even further preserve processing resources of the target system 404. For example, in the present approach, in response to determining that the data update 1 of GC1 is to be performed first, and data update 2 of GC3 is to be performed second, the data update 15 of GC4 may by process of elimination be determined to be ordered third in the determined ordering based on there only being three data updates in the set of data updates.

Figure 4D:
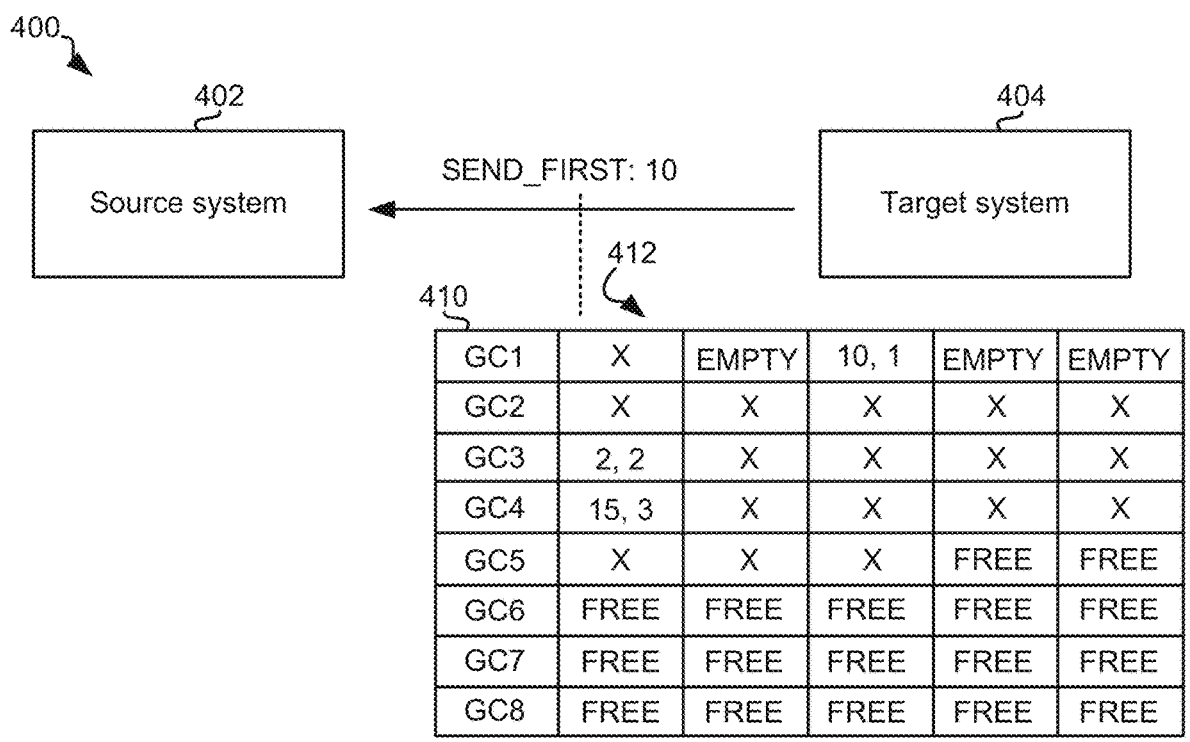

The determined ordering may be sent by the target system 404 to the source system 402, e.g., SEND FIRST: 10 of FIG. 4D. The determined ordering may in some preferred approaches be sent to the source system by the target system using minimal representation. For example, in some approaches, the determined ordering may be sent to the source system using run-length encoding and/or compressed messages.

In some approaches the determined ordering may be sent by the target system 404 to the source system 402 in more than one output, e.g., sequentially sending the determined ordering in a series of outputs. In some other approaches, the determined ordering may be sent by the target system 404 to the source system 402 in one output.

Figure 4E:
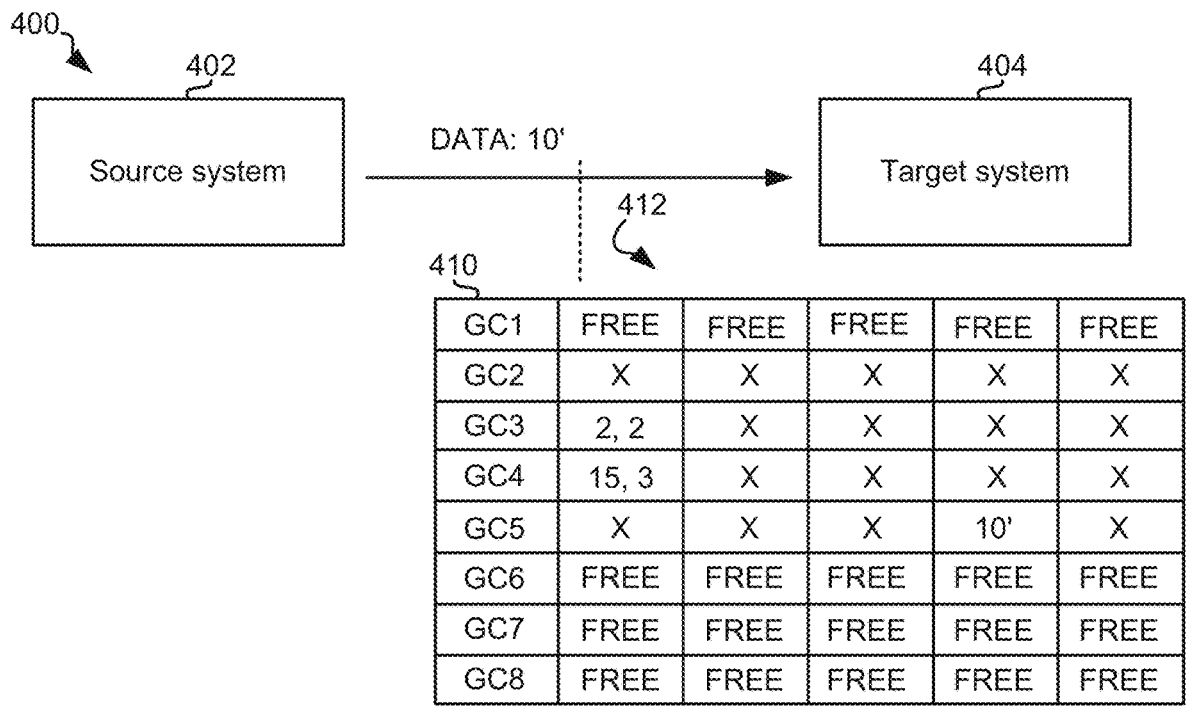
Figure 4F:
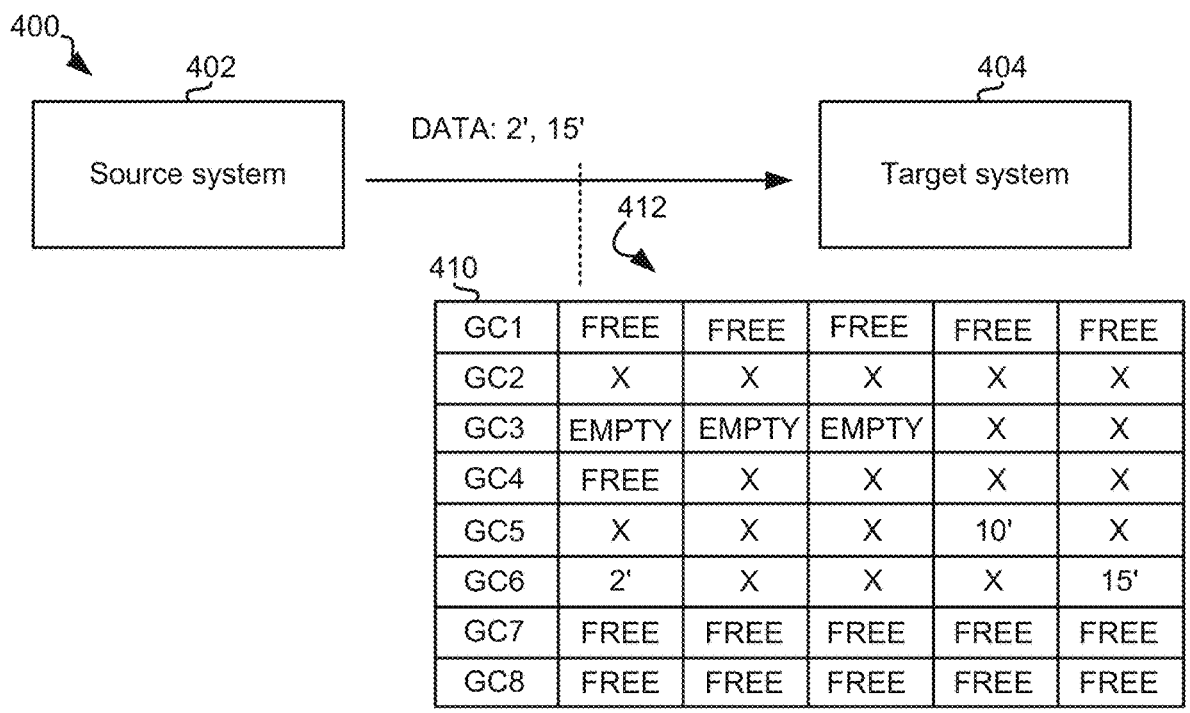
Figure 4G:
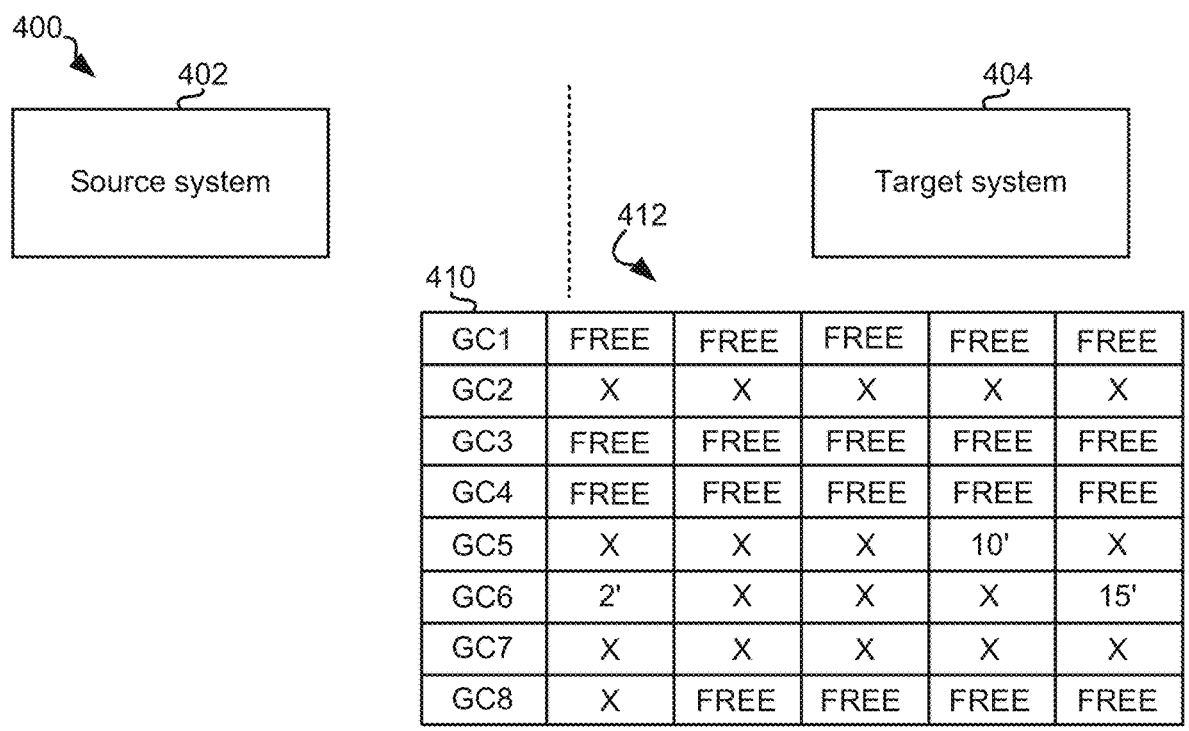

Referring now to FIGS. 4E-4F, the set of data updates, e.g., see 10', 2', 15', may be received by the target system 404 from the source system 402 in accordance with the determined ordering, e.g., 10' received first (see FIG. 4E) followed by 2' and then 15' (see FIG. 4F).

The set of data updates may be performed in accordance with the determined ordering, e.g., see FIGS. 4E-4F. For example, referring specifically now to FIG. 4E, it may be assumed that a writer of the target system 404 is actively writing to garbage collection units of GC5 upon the data update 10' being received by the target system 404. In such an example, subsequent to receiving the data updates 10', the data update is performed, e.g., see 10' is written to GC5 in FIG. 4E. Thereafter, subsequent to receiving the data updates 2' and 15', the data updates are performed, e.g., see 2' and 15' written to GC6 in FIG. 4E with other active data X.

In some approaches, while the target system 404 is waiting to receive the data updates, the target system 404 may perform garbage collection on physical storage areas where the data updates are not scheduled to be written. For example, while waiting to receive the data updates 2' and 15', the target system 404 may perform garbage collection on CG3 in an attempt to free the garbage collection units.

In some approaches garbage collection may be additionally and/or alternatively performed on data that is outdated as a result of performing the data updates. For example, in FIG. 4E, subsequent 10' being written to CG5, GC1 may be freed immediately thereafter, e.g., updated to a FREE state in the marked up reverse lookup table 410.

Subsequent performing the data updates, the target system 404 and/or the source system 402 may remain at a steady state, e.g., until a next description of a set of data updates is received by the target system 404, until a next description is output by the source system 402, until a next description is generated by one of the systems 402, 404, etc.

Figure 5:
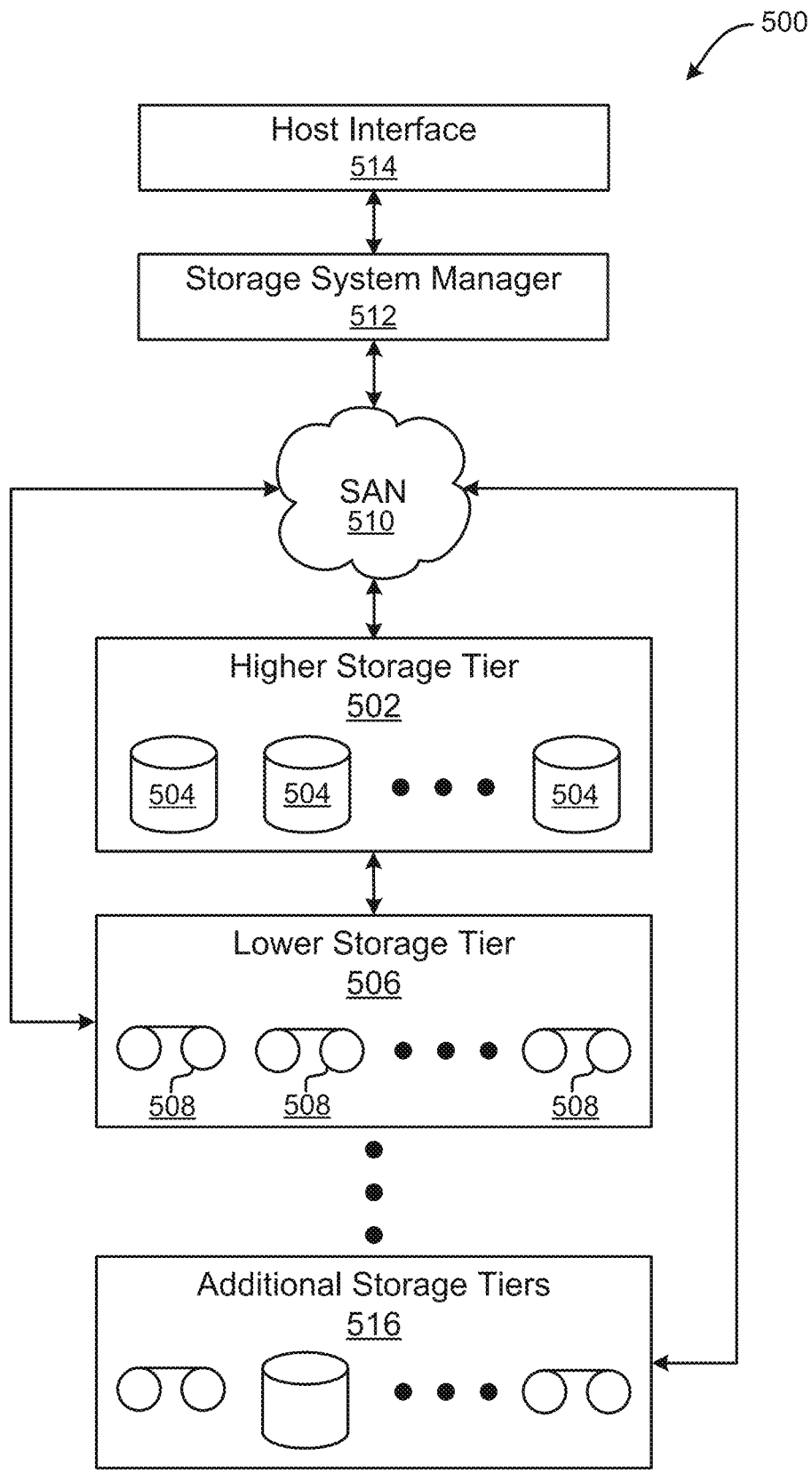
FIG. 5 is a tiered data storage system in accordance with one embodiment.

Now referring to FIG. 5, a storage system 500 is shown according to one embodiment. Note that some of the elements shown in FIG. 5 may be implemented as hardware and/or software, according to various embodiments. The storage system 500 may include a storage system manager 512 for communicating with a plurality of media and/or drives on at least one higher storage tier 502 and at least one lower storage tier 506. The higher storage tier(s) 502 preferably may include one or more random access and/or direct access media 504, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 506 may preferably include one or more lower performing storage media 508, including sequential access media such as magnetic tape in tape drives and/or optical media, slower accessing HDDs, slower accessing SSDs, etc., and/or others noted herein or known in the art. One or more additional storage tiers 516 may include any combination of storage memory media as desired by a designer of the system 500. Also, any of the higher storage tiers 502 and/or the lower storage tiers 506 may include some combination of storage devices and/or storage media.

The storage system manager 512 may communicate with the drives and/or storage media 504, 508 on the higher storage tier(s) 502 and lower storage tier(s) 506 through a network 510, such as a storage area network (SAN), as shown in FIG. 5, or some other suitable network type. The storage system manager 512 may also communicate with one or more host systems (not shown) through a host interface 514, which may or may not be a part of the storage system manager 512. The storage system manager 512 and/or any other component of the storage system 500 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 500 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 502, may include a majority of SSD storage media for storing data in a higher performing storage environment, and remaining storage tiers, including lower storage tier 506 and additional storage tiers 516 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 502, while data not having one of these attributes may be stored to the additional storage tiers 516, including lower storage tier 506. Of course, one of skill in the art, upon reading the present descriptions, may devise many other combinations of storage media types to implement into different storage schemes, according to the embodiments presented herein.

According to some embodiments, the storage system (such as 500) may include logic configured to receive a request to open a data set, logic configured to determine if the requested data set is stored to a lower storage tier 506 of a tiered data storage system 500 in multiple associated portions, logic configured to move each associated portion of the requested data set to a higher storage tier 502 of the tiered data storage system 500, and logic configured to assemble the requested data set on the higher storage tier 502 of the tiered data storage system 500 from the associated portions.

Of course, this logic may be implemented as a method on any device and/or system or as a computer program product, according to various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, by a target system from a source system, a description of a set of data updates that are to be written to a target volume of the target system, wherein the description includes a file that identifies grains of address ranges of the source system that are to be copied to the target system;
for each given portion of data of the target system that is to be rewritten during performance of the set of data updates, performing forward lookup on the target system for determining a physical storage address at which the given portion of data is located in the target system;

marking each of the determined physical storage addresses of the portions of data of the target system in a copy of a reverse lookup table of the target system;

using the marked-up reverse lookup table of the target system for determining an ordering in which the performance of the set of data updates would result in a least amount of garbage collection being performed while performing the set of data updates;

sending the determined ordering to the source system; and receiving the set of data updates in accordance with the determined ordering.

2. The computer-implemented method of claim 1, wherein the target system is a thin-provisioned system.

3. The computer-implemented method of claim 1, wherein each determined physical storage address is pre-associated with a plurality of garbage collection units of a garbage collection region, wherein determining the ordering includes:

determining a cost of performing garbage collection for each of the garbage collection regions; and assigning a unique score to each of the garbage collection regions based on the determined costs.

4. The computer-implemented method of claim 3, wherein the ordering in which the performance of the set of data updates would result in a least amount of garbage collection being performed while performing the set of data updates is a numerical ordering of the unique scores selected from the group of numerical orderings consisting of: a lowest score to a highest score, and a highest score to a lowest score.

5. The computer-implemented method of claim 3, wherein the cost of performing garbage collection for each of the garbage collection regions is determined using a function, wherein the function includes at least one variable selected from the group of variables consisting of: an amount of system processing resources utilized to recover a given garbage collection unit, a number of metadata updates required to be performed to recover the given garbage collection unit, and time.

6. The computer-implemented method of claim 1, comprising:

performing the set of data updates in accordance with the determined ordering, wherein the performing of the set of data updates includes rewriting more than one of the portions of data of the target system in a batch write.

7. The computer-implemented method of claim 1, comprising:

performing the set of data updates in accordance with the determined ordering, wherein the performing of the set of data updates includes rewriting at least one of the portions of data, wherein any performing of the rewriting at least one of the portions of data is postponed until any garbage collection performed on the at least one of the portions of data is completed.

8. A computer program product for determining an ordering in which performance of a set of data updates would result in a least amount of garbage collection being performed while performing the set of data updates, the computer program product comprising a computer readable storage medium having program instructions embodied therewith, the program instructions readable and/or executable by a target system to cause the target system to:

receive, by a target system from a source system, a description of a set of data updates that are to be written to a target volume of the target system, wherein the description includes a file that identifies grains of address ranges of the source system that are to be copied to the target system;

for each given portion of data of the target system that is to be rewritten during performance of the set of data updates, perform, by the target system, forward lookup on the target system for determining a physical storage address at which the given portion of data is located in the target system;

mark, by the target system, each of the determined physical storage addresses of the portions of data of the target system in a copy of a reverse lookup table of the target system;

use, by the target system, the marked-up reverse lookup table of the target system for determining an ordering in which the performance of the set of data updates would result in a least amount of garbage collection being performed while performing the set of data updates;

send, by the target system, the determined ordering to the source system; and receive, by the target system, the set of data updates in accordance with the determined ordering.

9. The computer program product of claim 8, wherein the target system is a thin-provisioned system.

10. The computer program product of claim 8, wherein each determined physical storage address is pre-associated with a plurality of garbage collection units of a garbage collection region, wherein determining the ordering includes:

determining a cost of performing garbage collection for each of the garbage collection regions; and assigning a unique score to each of the garbage collection regions based on the determined costs.

11. The computer program product of claim 10, wherein the ordering in which the performance of the set of data updates would result in a least amount of garbage collection being performed while performing the set of data updates is a numerical ordering of the unique scores selected from the group of numerical orderings consisting of: a lowest score to a highest score, and a highest score to a lowest score.

12. The computer program product of claim 10, wherein the cost of performing garbage collection for each of the garbage collection regions is determined using a function, wherein the function includes at least one variable selected from the group of variables consisting of: an amount of system processing resources utilized to recover a given garbage collection unit, a number of metadata updates required to be performed to recover the given garbage collection unit, and time.

13. The computer program product of claim 8, the program instructions readable and/or executable by the target system to cause the target system to:

perform, by the target system, the set of data updates in accordance with the determined ordering, wherein the performing of the set of data updates includes rewriting more than one of the portions of data of the target system in a batch write.

14. The computer program product of claim 8, the program instructions readable and/or executable by the target system to cause the target system to:

perform, by the target system, the set of data updates in accordance with the determined ordering, wherein the performing of the set of data updates includes rewriting at least one of the portions of data, wherein any performing of the rewriting at least one of the portions of data is postponed until any garbage collection performed on the at least one of the portions of data is completed.

15. A system, comprising:
a processor; and
logic integrated with the processor, executable by the processor, or integrated with and executable by the processor, the logic being configured to:
receive, by a target system from a source system, a description of a set of data updates that are to be written to a target volume of the target system, wherein the description includes a file that identifies grains of address ranges of the source system that are to be copied to the target system;
for each given portion of data of the target system that is to be rewritten during performance of the set of data updates, perform forward lookup on the target system for determining a physical storage address at which the given portion of data is located in the target system;
mark each of the determined physical storage addresses of the portions of data of the target system in a copy of a reverse lookup table of the target system;
use the marked-up reverse lookup table of the target system for determining an ordering in which the performance of the set of data updates would result in a least amount of garbage collection being performed while performing the set of data updates;
send the determined ordering to the source system; and
receive the set of data updates in accordance with the determined ordering.

16. The system of claim 15, wherein each determined physical storage address is pre-associated with a plurality of garbage collection units of a garbage collection region, wherein determining the ordering includes:

determining a cost of performing garbage collection for each of the garbage collection regions; and
assigning a unique score to each of the garbage collection regions based on the determined costs.

17. The system of claim 16, wherein the ordering in which the performance of the set of data updates would result in a least amount of garbage collection being performed while performing the set of data updates is a numerical ordering of the unique scores selected from the group of numerical orderings consisting of: a lowest score to a highest score, and a highest score to a lowest score.

18. The system of claim 16, wherein the cost of performing garbage collection for each of the garbage collection regions is determined using a function, wherein the function includes at least one variable selected from the group of variables consisting of: an amount of system processing resources utilized to recover a given garbage collection unit, a number of metadata updates required to be performed to recover the given garbage collection unit, and time.

19. The system of claim 15, the logic being configured to:
perform the set of data updates in accordance with the determined ordering, wherein the performing of the set of data updates includes rewriting more than one of the portions of data of the target system in a batch write.

20. The system of claim 15, the logic being configured to:
perform the set of data updates in accordance with the determined ordering, wherein the performing of the set of data updates includes rewriting at least one of the portions of data, wherein any performing of the rewriting at least one of the portions of data is postponed until any garbage collection performed on the at least one of the portions of data is completed.

* * * * *